United States Patent
Lee et al.

(10) Patent No.: US 7,521,815 B2
(45) Date of Patent: Apr. 21, 2009

(54) MICRO POWER GENERATING DEVICE

(75) Inventors: Yong Bok Lee, Seoul (KR); Seung-Jong Kim, Seoul (KR); Chang Ho Kim, Seoul (KR); Keun Ryu, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 11/666,052

(22) PCT Filed: Nov. 25, 2004

(86) PCT No.: PCT/KR2004/003058

§ 371 (c)(1),
(2), (4) Date: Oct. 17, 2007

(87) PCT Pub. No.: WO2006/043734

PCT Pub. Date: Apr. 27, 2006

(65) Prior Publication Data

US 2008/0136190 A1    Jun. 12, 2008

(30) Foreign Application Priority Data

Oct. 19, 2004   (KR) .................... 10-2004-0083604

(51) Int. Cl.
*F02C 3/00* (2006.01)
(52) U.S. Cl. .................................................... 290/52
(58) Field of Classification Search .................... 290/52
See application file for complete search history.

(56) References Cited

U.S. PATENT DOCUMENTS 4,552,466 A * 11/1985 Warren ...................... 384/103
4,950,089 A * 8/1990 Jones ......................... 384/103
5,497,615 A * 3/1996 Noe et al. ................. 60/39.511
5,911,511 A * 6/1999 Saville ....................... 384/106
5,932,940 A * 8/1999 Epstein et al. .......... 310/40 MM
6,246,138 B1   6/2001 Nims
6,307,278 B1  10/2001 Nims et al.
6,392,313 B1   5/2002 Epstein et al.
6,527,446 B2   3/2003 Lee et al.
6,695,575 B1 * 2/2004 Sasse et al. ................. 415/107
6,814,537 B2 * 11/2004 Olsen ......................... 415/111
6,987,329 B1 * 1/2006 Smith et al. ................... 290/2
7,374,342 B2 * 5/2008 Yum et al. ................... 384/106

FOREIGN PATENT DOCUMENTS

JP        2003286862 A  * 10/2003

* cited by examiner

*Primary Examiner*—Joseph Waks
(74) *Attorney, Agent, or Firm*—Jones Day

(57) ABSTRACT

There is provided a micro power generating device. A compressor impeller and a turbine wheel are coupled to the ends of a rotating shaft. A cooler is provided for lowering a temperature of the compressed air from the compressor impeller. The compressed air is mixed with the fuel and combusted in a combustion chamber. An air foil thrust bearing for supporting the rotating shaft has a thrust collar coupled to the rotating shaft, as well as a pair of thrust discs located apart from the thrust collar and fixed to the housing. Impeller type seals are formed at both surfaces of the thrust collar and impulse turbine blades are formed at the periphery of the thrust collar. A generator is positioned between the air foil thrust bearing and the compressor impeller. A portion of the cool air is bypassed toward the generator and the impulse turbine blades from the cooler.

12 Claims, 3 Drawing Sheets

MICRO POWER GENERATING DEVICE

TECHNICAL FIELD

The present invention generally relates to a power generating device, and more particularly to a micro power generating device, which is mobile and lightweight, as well as being adapted for significant power production of hundreds of watts.

BACKGROUND ART

Compact, highly mobile and efficient thermodynamic and energy systems are becoming increasingly important for a wide range of applications, such as for powering portable electronic, communication and medical devices, as well as for controlling sensor systems.

Historically, batteries, such as primary and rechargeable batteries, have been utilized for supplying portable, compact sources of power. However, portable batteries are generally limited to power production in the range of milliwatt to watts, and thus cannot address the need for significant power production. Further, they also cannot address the need for a mobile and lightweight power generating device. The environmental incompatibility of typical conventional batteries also poses a limitation for many applications.

U.S. Pat. No. 6,392,313 discloses a microturbomachinery that enables production of significant power and efficient operation of thermodynamic systems in the millimeter and micron range, as shown in FIG. 1.

Referring to FIG. 1, in operation, air 12 enters the microgas turbine engine 10 (hereinafter also referred to as the microengine) axially along the centerline 14 of an inlet 16 and turns radially outward. It is then compressed in a centrifugal, planar microcompressor. The microcompressor includes a compressor rotor disk 18, which has radial-flow rotor blades 20.

The compressor rotor disk 18 is connected to a shaft 40 that is radially journalled for spinning, whereby the compressor rotor disk 18 and blades 20 supported by the shaft 40 are spun. Stationary diffuser vanes 22 are located just beyond the radial periphery of the compressor rotor. As such, the air passing through the compressor rotor blades 20 can exit the rotor via the vanes 22 in the diffuser.

Fuel is injected at the discharge of the compressor rotor 18 by way of a fuel injector 24. The injected fuel mixes with the air while flowing radially outward. Combustion igniters 33 initiate combustion of the air-fuel mixture. The ignited mixture axially enters an annular microcombustion chamber 30 where the mixture is fully combusted.

Combustion exhaust gas from the microcombustion chamber 30 is discharged radially inward through stationary turbine guide vanes 34 to a planar radial inflow microturbine rotor formed of a rotor disk 36. The turbine disk 36 is connected by way of the journalled shaft 40 to the compressor disk 18 and thus rotationally drives the microcompressor in response to the combustion gas exhausted through microturbine blades 38, which causes the turbine disk 36 to spin.

The shaft 40 between the microcompressor and microturbine is preferably hollow and is supported upon air static bearings. The bearings are supplied by an air bleed 42 from the microcompressor exit. Correspondingly, the shaft bearing discharges the air through the holes 44 in the microturbine.

Under a high temperature environment, it is very difficult to convert the rotating energy into the electrical energy. However, the aforesaid prior art microturbomachinery is not properly configured for power production by using the rotating energy of the shaft since it is not equipped with a cooling device.

Also, since the air static bearing is used for supporting the rotating shaft, the prior art microturbomachinery is disadvantageous in that the performance of the bearing is considerably influenced by the manufacturing tolerance. Thus, the manufacturing process of the overall system must be maintained very strictly and may become complicated. It also causes an increase in manufacturing costs. Such a shortcoming means that there is a great difficulty in achieving the operational stability of the system.

DISCLOSURE

Technical Problem

It is, therefore, an object of the present invention to provide a micro power generating device designed for high-efficient power production and advanced operational and thermal stabilities.

It is another object of the present invention to provide a micro power generating device, which is integrally equipped with a generator, so as to provide a simplified and lightweight structure.

Technical Solution

In order to achieve the above objects, the present invention provides a micro power generating device, comprising: a housing; a hollow rotating shaft mounted through the housing; bearings for supporting the rotating shaft; a compressor impeller coupled to an end of the rotating shaft, the compressor impeller being configured to suck and compress air; a cooler for lowering a temperature of the compressed air from the compressor impeller; a combustion chamber in which the compressed air is mixed with fuel and combusted; a turbine wheel coupled to an other end of the rotating shaft, the turbine wheel being rotated by the combustion gas exhausted from the combustion chamber; and a generator having a stator installed in the housing and a rotor fixed to the rotating shaft so as to be rotated together.

Preferably, the rotating shaft, the compressor impeller and the turbine wheel are fabricated from an inconel material or silicon nitride.

The bearings include a high temperature air foil thrust bearing mounted to an axial-middle portion of the rotating shaft for supporting an axial thrust of the rotating shaft. The combustion chamber is positioned between the high temperature air foil thrust bearing and the turbine wheel. Further, the generator is positioned between the high temperature air foil thrust bearing and the compressor impeller.

The high temperature air foil thrust bearing has a thrust collar coupled to the rotating shaft so as to be rotated together. It further has a pair of thrust discs located apart from the thrust collar and fixed to the housing. The thrust collar is interposed between the pair of thrust discs, and the thrust disc is formed with elastic foils. Preferably, the thrust collar and the thrust discs are coated with chromium molybdenum. Impeller type seals are formed at both surfaces of the thrust collar, and impulse turbine blades are formed at the periphery of the thrust collar.

A first bypass passage is branched from the cooler for bypassing a portion of the cool air to the generator. Further, a second bypass passage is branched from the cooler for bypassing a portion of the cool air to the thrust collar. A valve is mounted on the first bypass passage for adjusting the flow rate of the cool air.

The bearings further include a first high temperature air foil journal bearing for supporting the rotating shaft positioned between the air foil thrust bearing and the turbine wheel. The bearings also include a second high temperature air foil journal bearing for supporting the rotating shaft positioned between the air foil thrust bearing and the compressor impeller. The first and second high temperature air foil journal bearings have a ring-shaped frame surrounding the rotating shaft, a bump foil equipped around the inner periphery of the frame, and a top foil mounted over the bump foil.

The rotor of the generator comprises a plurality of permanent magnets inserted into the hollow rotating shaft and attached to the inner periphery of the rotating shaft such that the N-pole and S-pole are arranged in an alternating manner. Further, the stator of the generator has a core provided around the frame of the second high temperature air foil journal bearing, coil portions wound around the core, and polycoat portions molded to spaces between adjacent coil portions.

BEST MODE

The preferred embodiments of the present invention will now be described in detail with reference to the accompanying drawings.

Figure 1:
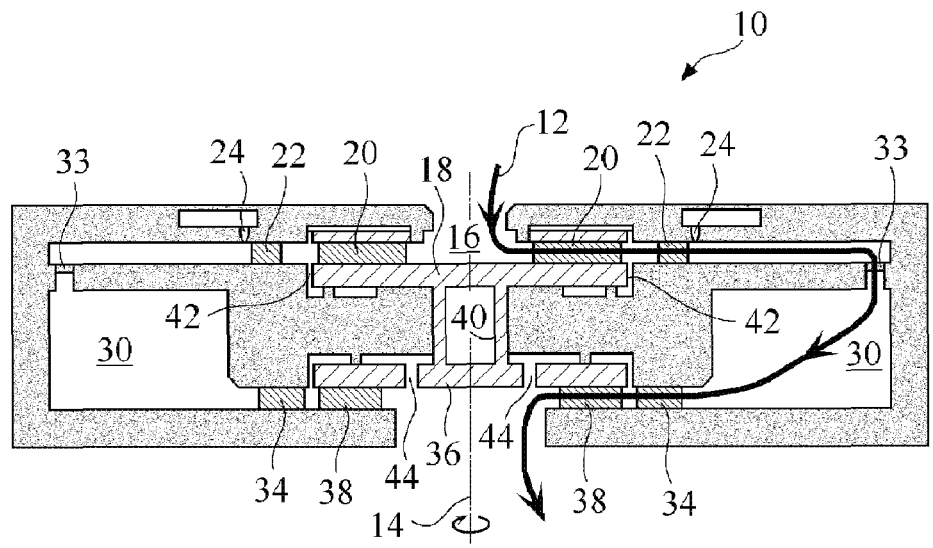
FIG. 1 is a cross-sectional view illustrating a microturbomachinery of the prior art.
Figure 2:
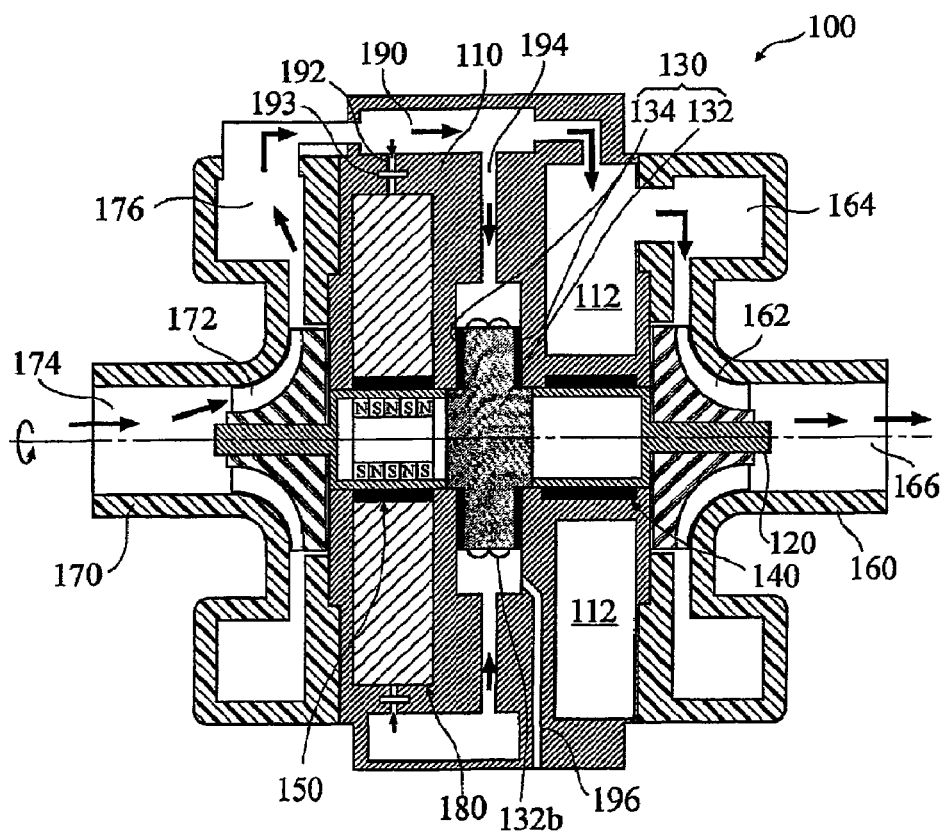
FIG. 2 is a cross-sectional view illustrating a micro power generating device constructed in accordance with the present invention.

FIG. 2 is a cross-sectional view illustrating a micro power generating device constructed in accordance with the present invention.

As shown in the drawing, a micro power generating device of the present invention comprises a central housing 110 and a rotating shaft 120 mounted through the central housing 110 along a horizontal central axis. The rotating shaft 120 is supported rotatably by high temperature air foil bearings 130, 140 and 150. A turbine wheel 162 having blades is coupled to one end of the rotating shaft 120. A compressor impeller 172 is coupled to the other end of the rotating shaft 120. Preferably, the shaft 120 between the turbine wheel 162 and the compressor impeller 172 is hollow so as to reduce an inertia effect caused by an initial torque at starting the rotating shaft 120.

A combustion chamber 112 is formed inside the central housing 110. The compressed air mixes with the fuel supplied by a fuel injector (not shown) and the air-fuel mixture is combusted by an igniter (not shown). The combustion chamber 112 is in communication with an inlet 164 of a turbine housing 160, which accommodates the turbine wheel 162. High temperature and high pressure combustion gas exhausted from the combustion chamber 112 is directed to the blades of the turbine wheel 162 through the inlet 164 of the turbine housing 160, which causes the turbine wheel 162 to spin, and is then discharged outside through an outlet 166. The turbine wheel 162 is connected by way of the rotating shaft 120 to the compressor impeller 172 and thus rotationally drives the compressor impeller 172 in response to the combustion gas exhausted from the combustion chamber 112, which causes the turbine wheel 162 to spin. Accordingly, air is sucked into the compressor housing 170 through an inlet 174 and compressed by the compressor impeller 172. Thereafter, the compressed air is forced into the combustion chamber 112 through an outlet 176.

Preferably, the rotating shaft 120 has an outer diameter of about 5 mm to 7 mm, and a length of about 30 mm to 35 mm. Both the turbine wheel 162 and the compressor impeller 172 have a diameter of about 10 mm to 15 mm. Through such construction, the rotating speed of the shaft 120 can reach the range from about 800,000 rpm to 1,000,000 rpm. The rotating shaft 120, the turbine wheel 162 and the compressor impeller 172 are preferably fabricated from a material, which has high thermal stability and rigidity, such as an inconel material (e.g., Inconel 718) or a ceramic material (e.g., silicon nitride).

A high temperature air foil thrust bearing 130 is mounted to an axial-middle portion of the rotating shaft 120 so as to support the axial thrust of the rotating shaft 120. The high temperature air foil thrust bearing 130 includes a thrust collar 132, which is coupled to the rotating shaft 120 so as to be rotated together therewith. It further includes a pair of thrust discs 134 located apart from the thrust collar 132 with a predetermined gap and fixed to the central housing 110. The thrust collar 132 is interposed between the pair of thrust discs 134.

The thrust disc 134 is formed with foils (not shown), which have elasticity and which are laid in a manner so as to overlap each other. Each foil has a streamline shape, thus having a tail portion and an edge portion. The tail portion is fixed to the surface of the thrust disc 134, whereas the edge portion is placed in contact with the adjacent foil.

When the thrust collar 132 rotates with the rotating shaft 120, air is introduced into the space between the thrust collar 132 and the foils. Thus, the foils, which have been kept in contact with the thrust collar 132, are elastically deformed away from the thrust collar 132. The foils are preferably fabricated from an inconel material (e.g., Inconel X-750), which has high thermal stability and rigidity, and coated with a hybrid type solid lubricant having heat and abrasion resistance and low friction characteristics, thereby enhancing the durability and operational reliability of the air foil thrust bearing 130.

Figure 3:
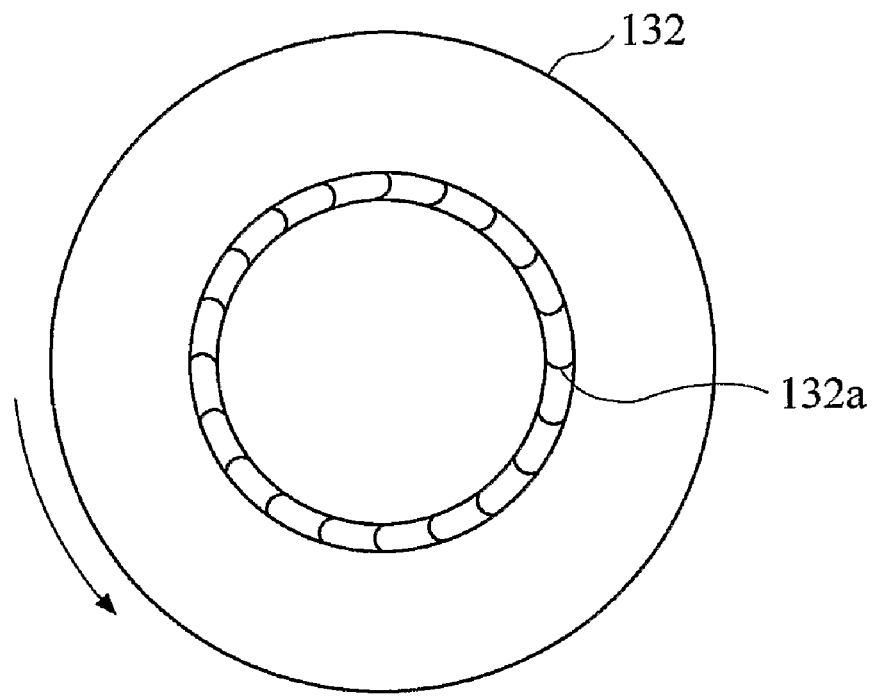
FIG. 3 is a front view illustrating a thrust collar of a high temperature air foil thrust bearing in a micro power generating device constructed in accordance with the present invention.

Preferably, the thrust collar 132 and the thrust discs 134 are coated with a heat resistant material such as chromium molybdenum. This is so that the heat can be prevented from being transferred to a generator 180 (which will be described later) from the turbine wheel 162 by which high temperature (1,000° C.) combustion gas passes. As shown in FIG. 3, impeller type seals 132a are formed at both surfaces of the thrust collar 132. When the thrust collar 132 rotates, since high pressure is formed around the thrust collar 132 by the working of the seals 132a, the heated air is prevented from being directed to the generator 180 from the turbine wheel 162. Also, impulse turbine blades 132b are formed at the periphery of the thrust collar 132 so as to provide an additional driving force to the rotating shaft 120, as will be explained below.

Figure 4:
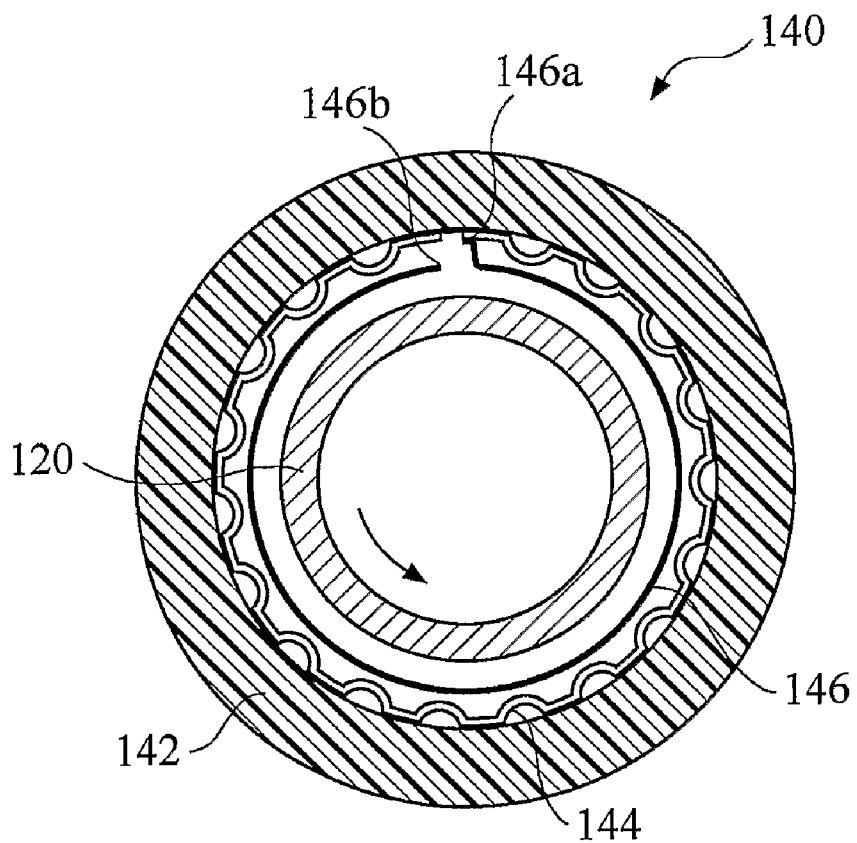
FIG. 4 is a cross-sectional view illustrating a coupling structure of a rotating shaft and a first high temperature air foil journal bearing in a micro power generating device constructed in accordance with the present invention.

A first high temperature air foil journal bearing 140 is mounted around a portion of the rotating shaft 120, which is located between the air foil thrust bearing 130 and the turbine housing 160. As shown in FIG. 4, the first high temperature air foil journal bearing 140 includes a ring-shaped frame 142 surrounding the rotating shaft 120, a bump foil 144 equipped around the inner periphery of the frame 142, and a top foil 146 mounted over the bump foil 144 and supporting a load applied perpendicularly to the axis of a rotating shaft 120. The frame 142 is preferably made from polycoat. Herein, the polycoat is a synthetic high polymer substance having high tensile strength and good antiabrasion features, and mainly comprises Polyvinylalcohol. The top foil 146 includes a fixing end 146*a* fixed to the inner periphery of the frame 142 and a free end 146*b* extending over the bump foil 144. The surface of the bump foil 144, which contacts the top foil 146, is preferably formed in a curved shape corresponding to the rotating shaft 120 so as to increase the contacting area with the top foil 146. The top foil 146 is preferably made from an inconel material (e.g., Inconel X-750), which has high thermal stability and rigidity, and coated with a hybrid type solid lubricant having heat and abrasion resistance and low friction characteristics to thereby enhance the durability and operational reliability.

While the rotating shaft 120 is placed in contact with the top foil 146, when the rotating shaft 120 starts to rotate, air is introduced into the space between the rotating shaft 120 and the foils 144 and 146, and the bump foil 144 is elastically deformed away from the rotating shaft 120. Accordingly, the rotating shaft 120 rotates while being apart from the top foil 146. As such, the air foil bearing stably supports the rotating body as the bump foil is elastically deformed according to the rotation of the rotating body. Especially, the air foil bearing has features for flexibly coping with unstable or terrible conditions such as invasion of exterior materials or expansion of the rotating body due to the high temperature or centrifugal force.

Because the temperature of the turbine wheel 162 is very high, the generator 180 is installed between the air foil thrust bearing 130 and the compressor housing 170. Also, a portion of the rotating shaft 120, which is located between the air foil thrust bearing 130 and the compressor housing 170, is supported by a second high temperature air foil journal bearing 150.

Figure 5:
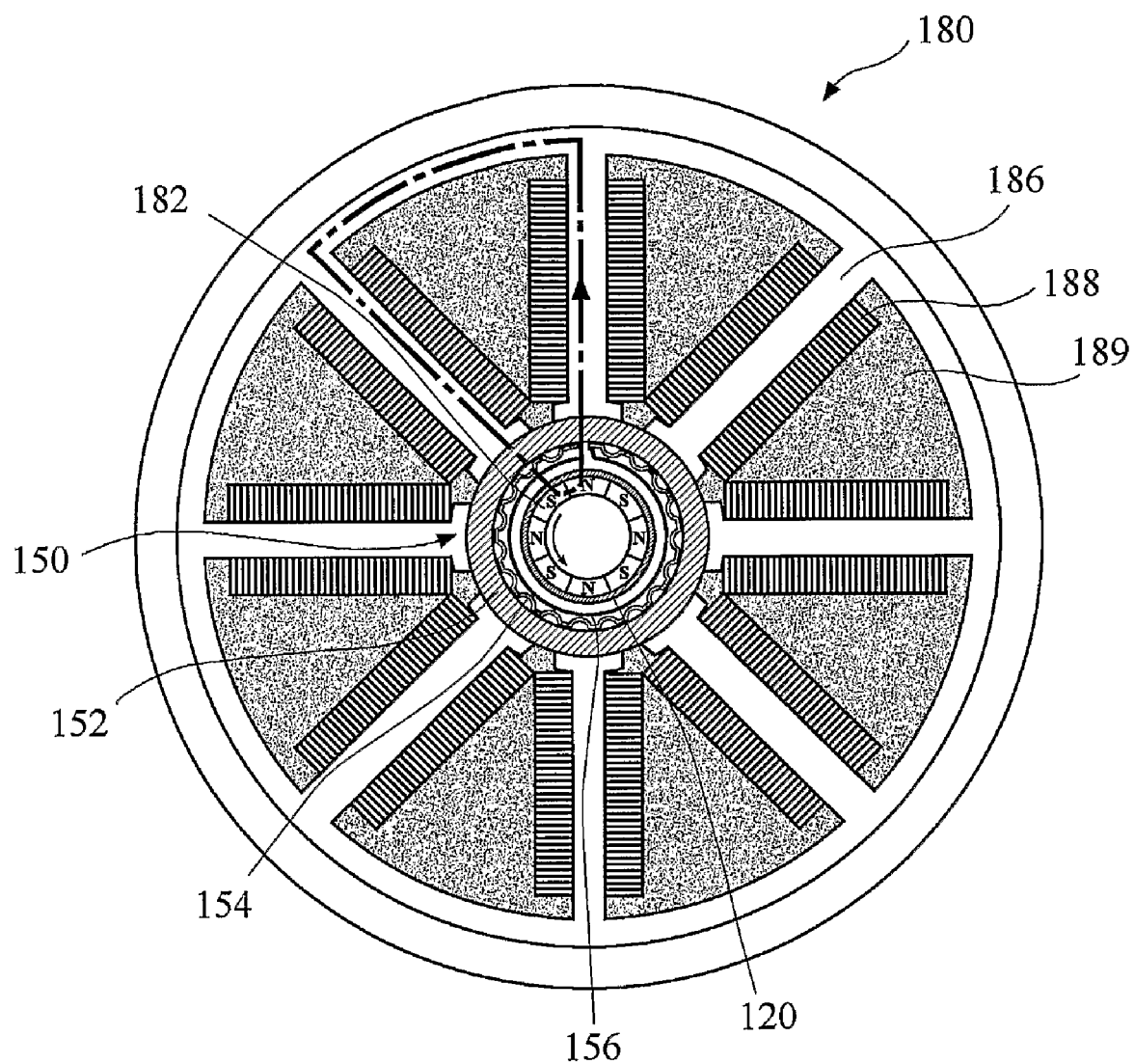
FIG. 5 is a cross-sectional view showing a coupling structure of a rotating shaft, a second high temperature air foil journal bearing and a generator in a micro power generating device constructed in accordance with the present invention.

FIG. 5 is a cross-sectional view illustrating a coupling structure of the rotating shaft, the second high temperature air foil journal bearing and the generator. As shown in the drawing, a rotor of the generator 180 comprises a plurality of permanent magnets 182, which are inserted into the hollow rotating shaft 120 and attached to the inner periphery of the rotating shaft 120 such that the N-pole and S-pole are arranged in an alternating manner. The rotating shaft 120 with the permanent magnets 182 are supported by a second high temperature air foil journal bearing 150.

The second high temperature air foil journal bearing 150 includes a ring-shaped frame 152 surrounding the rotating shaft 120, a bump foil 154 equipped around the inner periphery of the frame 152, and a top foil 156 mounted over the bump foil 154. The frame 152 is preferably fabricated from polycoat. The top foil 156 includes a fixing end fixed to the inner periphery of the frame 152 and a free end extending over the bump foil 154 (refer to FIG. 4). The top foil 156 is preferably fabricated from an inconel material (e.g., Inconel X-750), which has high thermal stability and rigidity, and coated with a hybrid type solid lubricant having heat and abrasion resistance and low friction characteristics, thereby enhancing the durability and operational reliability.

A stator of the generator 180 is provided around the second high temperature air foil journal bearing 150, which corresponds to the permanent magnets 182. The stator includes a core 186, which is formed by stacking a plurality of silicon steel sheets, and coil portions 188 wound around the core 186. A polycoat 189 is molded to the space between two adjacent coil portions 188. The polycoat portion 189 attenuates the vibration of the generator 180 itself and reduces the noise. Also, the polycoat portion 189 effectively discharges the heat generated from the generator 180 outside.

Since the core 186 of the generator 180 and the polycoat portions 189 support the frame 152 of the second high temperature air foil journal bearing 150 around the same, the dynamic stability of the bearing 150 can be maintained by the vibration-attenuating features of the polycoat. This is even when the rotating shaft 120 rotates in a high speed or an exterior shock is applied to the micro power generating device 100.

Referring back to FIG. 2, a cooler 190 having a plurality of air-cooling type fins (not shown) is provided between the outlet 176 of the compressor housing 170 and the combustion chamber 112 so as to lower the temperature of the air sucked and compressed by the compressor impeller 172. A first bypass passage 192 is branched from the cooler 190 for supplying the cool air to the generator 180. Further, a second bypass passage 194 is branched from the cooler 190 for supplying the cool air to the thrust collar 132.

A valve 193 is mounted on the first bypass passage 192 for adjusting the flow rate of the cool air. The valve 193 is opened or closed by a controller (not shown), which is electrically connected to the generator 180. That is, in response to the temperature signal detected from the generator 180, if the temperature is larger than the predetermined value, then the controller opens the valve 193 to allow the cool air to flow to the generator 180 through the first bypass passage 192.

The cool air passing through the second bypass passage 194 collides with the impulse turbine blades 132*b* formed at the outer periphery of the thrust collar 132 to supply additional driving force to the rotating shaft 120. The reference numeral 196 indicates an exhaust passage through which the cool air is discharged outside the housing 110 after collision with the impulse turbine blades 132*b*.

Hereinafter, the operational effect of the micro power generating device of the present invention will be described.

When the high temperature and high pressure combustion gas from the combustion chamber 112 is exhausted toward the turbine housing 160, the turbine wheel 162 is rotated in high speed by the energy of the exhaust gas. At the same time, the compressor impeller 172 connected to the turbine wheel 162 by the rotating shaft 120 is rotated together, while the rotating shaft 120 is supported by the air foil bearings 130, 140 and 150. Air is sucked into the compressor housing 170 through the inlet 174 and compressed to a high temperature and high pressure by the action of the compressor impeller 172. Then, the compressed air is directed toward the cooler 190 through the outlet 176 of the compressor housing 170.

The compressed air is cooled while passing through the cooler 190. A portion of the cooled air flows toward the generator 180 through the first bypass passage 192 in order to cool the generator 180 and increase the thermal stability. Also, a portion of the cooled air flows toward the thrust collar 132 through the second bypass passage 194 and collides with the impulse turbine blades 132*b* formed at the periphery of the thrust collar 132, thereby providing the additional driving force (i.e., rotating force) to the thrust collar 132 and the rotating shaft 120. The most cooled air except for the bypassed air is introduced into the combustion chamber 112 and is mixed with the fuel to be combusted.

The permanent magnets 182, which are fitted into the rotating shaft 120, are rotated in high speed with the rotating shaft 120. Therefore, as illustrated by the imaginary-line arrow in FIG. 5, an alternating flux comes in interlinkage with the coil portions 188 wound around the core 186 so as to produce power of about 100 watt to 200 watt.

INDUSTRIAL APPLICABILITY

As explained above in detail, since a micro power generating device of the present invention is configured so that a rotating shaft is stably supported by air foil bearings, the operational reliability of the device can be enhanced.

Also, by being combined with a generator, the present invention is simplified in structure and is lightweight. Thus, it can be easily equipped with a micro air vehicle, a mobile robot and the like.

Also, through cooling the compressed air from a compressor impeller and bypassing a portion of the cooled air toward the generator, the thermal stability can be increased. Also, by bypassing a portion of the cooled air toward impulse turbine blades of a thrust collar, the driving force, i.e., the rotating force of the rotating shaft can be enhanced.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes, which come within the equivalent meaning and range of the claims, are to be embraced within their scope.

The invention claimed is:

1. A micro power generating device, comprising:
    a housing;
    a hollow rotating shaft mounted through the housing;
    a plurality of bearings for supporting the rotating shaft;
    a compressor impeller coupled to a first end of the rotating shaft, the compressor impeller being configured to suck and compress air;
    a cooler for decreasing a temperature of the compressed air from the compressor impeller;
    a combustion chamber in which the compressed air is mixed with fuel and combusted;
    a turbine wheel coupled to a second end of the rotating shaft, the turbine wheel being rotated by the combustion gas exhausted from the combustion chamber;
    a generator having a stator installed in the housing and a rotor fixed to the rotating shaft so as to be rotated together,
    wherein the bearings include a high temperature air foil thrust bearing mounted to an axial-middle portion of the rotating shaft for supporting an axial thrust of the rotating shaft,
    wherein the combustion chamber is positioned between the high temperature air foil thrust bearing and the turbine wheel, and
    wherein the generator is positioned between the high temperature air foil thrust bearing and the compressor impeller.

2. The micro power generating device of claim 1, wherein the rotating shaft, the compressor impeller and the turbine wheel are fabricated from an inconel material.

3. The micro power generating device of claim 1, wherein the rotating shaft, the compressor impeller and the turbine wheel are fabricated from silicon nitride.

4. The micro power generating device of claim 1, wherein the rotating shaft has an outer diameter of about 5 mm to 7 mm and a length of about 30 mm to 35 mm, and wherein the turbine wheel and the compressor impeller each have a diameter of 10 mm to 15 mm.

5. The micro power generating device of claim 1, wherein the high temperature air foil thrust bearing has a thrust collar coupled to the rotating shaft so as to be rotated together and a pair of thrust discs located apart from the thrust collar and fixed to the housing, the thrust collar being interposed between the pair of thrust discs, and wherein the thrust disc is formed with elastic foils.

6. The micro power generating device of claim 5, wherein the thrust collar and the thrust discs are coated with chromium molybdenum.

7. The micro power generating device of claim 5, wherein impeller type seals are formed at both surfaces of the thrust collar, and wherein impulse turbine blades are formed at the periphery of the thrust collar.

8. The micro power generating device of claim 7, wherein a first bypass passage is branched from the cooler for bypassing a portion of the cool air to the generator and a second bypass passage is branched from the cooler for bypassing a portion of the cool air to the thrust collar, and
    wherein a valve is mounted on the first bypass passage for adjusting the flow rate of the cool air.

9. The micro power generating device of claim 1, wherein the bearings include a first high temperature air foil journal bearing for supporting the rotating shaft positioned between the air foil thrust bearing and the turbine wheel, and wherein the bearings further include a second high temperature air foil journal bearing for supporting the rotating shaft positioned between the air foil thrust bearing and the compressor impeller.

10. The micro power generating device of claim 9, wherein the first and second high temperature air foil journal bearings have a ring-shaped frame surrounding the rotating shaft, a bump foil equipped around the inner periphery of the frame, and a top foil mounted over the bump foil.

11. The micro power generating device of claim 10, wherein the frame is fabricated from polycoat.

12. The micro power generating device of claim 10, wherein the rotor of the generator comprises a plurality of permanent magnets inserted into the hollow rotating shaft and attached to the inner periphery of the rotating shaft such that N-pole and S-pole are arranged alternately, and
    wherein the stator of the generator has a core provided around the frame of the second high temperature air foil journal bearing, coil portions wound around the core, and polycoat portions molded to spaces between adjacent coil portions.

* * * * *